(12) United States Patent
Oomuro et al.

(10) Patent No.: US 10,270,132 B2
(45) Date of Patent: Apr. 23, 2019

(54) ELECTROLYTE FOR NON-AQUEOUS ELECTROLYTE BATTERY AND NON-AQUEOUS ELECTROLYTE LITHIUM BATTERY

(71) Applicant: Central Glass Company, Limited, Ube-shi, Yamaguchi (JP)

(72) Inventors: Hitoshi Oomuro, Tokyo (JP); Shoichi Tsujioka, Tokyo (JP)

(73) Assignee: Central Glass Company, Limited, Ube-shi (JP)

( * ) Notice: Subject to any disclaimer, the term of this patent is extended or adjusted under 35 U.S.C. 154(b) by 0 days.

(21) Appl. No.: 15/525,309

(22) PCT Filed: Sep. 17, 2015

(86) PCT No.: PCT/JP2015/076383
§ 371 (c)(1),
(2) Date: May 9, 2017

(87) PCT Pub. No.: WO2016/080063
PCT Pub. Date: May 26, 2016

(65) Prior Publication Data
US 2017/0317384 A1   Nov. 2, 2017

(30) Foreign Application Priority Data

Nov. 19, 2014   (JP) ................................ 2014-234152

(51) Int. Cl.
| H01M 10/0567 | (2010.01) |
| H01M 10/0568 | (2010.01) |
| H01M 10/0569 | (2010.01) |
| H01M 10/052  | (2010.01) |
| H01M 10/0525 | (2010.01) |
| H01M 10/42   | (2006.01) |

(52) U.S. Cl.
CPC ..... *H01M 10/0567* (2013.01); *H01M 10/052* (2013.01); *H01M 10/0525* (2013.01); *H01M 10/0568* (2013.01); *H01M 10/0569* (2013.01); *H01M 10/4235* (2013.01); *H01M 2300/0025* (2013.01); *H01M 2300/0037* (2013.01); *Y02E 60/122* (2013.01); *Y02T 10/7011* (2013.01)

(58) Field of Classification Search
None
See application file for complete search history.

(56) References Cited

U.S. PATENT DOCUMENTS

| 6,197,205 | B1 | 3/2001 | Tsujioka et al. |
| 6,200,701 | B1 | 3/2001 | Gan et al. |
| 2001/0004506 | A1 | 6/2001 | Gan et al. |
| 2010/0323240 | A1 | 12/2010 | Tsujioka et al. |
| 2011/0274981 | A1 | 11/2011 | Yamada et al. |
| 2012/0308881 | A1 | 12/2012 | Tokuda et al. |
| 2013/0129595 | A1 | 5/2013 | Schulz et al. |
| 2013/0224565 | A1* | 8/2013 | Inagaki ............... H01M 10/056 429/158 |
| 2014/0272604 | A1 | 9/2014 | Lim et al. |
| 2015/0340736 | A1* | 11/2015 | Kim ................... H01M 10/052 429/126 |
| 2017/0317384 | A1 | 11/2017 | Oomuro et al. |

FOREIGN PATENT DOCUMENTS

| JP | 10-92468 A | 4/1998 |
| JP | 11-67270 A | 3/1999 |
| JP | 2004-31079 A | 1/2004 |
| JP | 2007-141830 A | 6/2007 |
| JP | 2007-165125 A | 6/2007 |
| JP | 2007-173180 A | 7/2007 |
| JP | 2008-222484 A | 9/2008 |
| JP | 2011-65986 A | 3/2011 |
| JP | 2011-82182 A | 4/2011 |
| JP | 2011-86630 A | 4/2011 |
| JP | 2011-181358 A | 9/2011 |
| JP | 2013-534205 A | 9/2013 |
| JP | 2014-62036 A | 4/2014 |
| JP | 2014-132576 A | 7/2014 |
| JP | 2016-100100 A | 5/2016 |

(Continued)

OTHER PUBLICATIONS

Japanese-language Office Action issued in counterpart Japanese Application No. 2014-234152 dated Dec. 27, 2017 (four (4) pages).
K. Momota, "Chemistry of Non-Aqueous Fluorine-Containing Supporting Electrolytes," Battery Technology, 1996, pp. 108-117, vol. 8, Electrochemical Society of Japan, (with partial English-language translation) (six (6) pages).
Taiwanese Office Action issued in counterpart Taiwanese Application No. 104136371 dated Aug. 18, 2016 with partial English-language translation (five (5) pages).
International Search Report (PCT/ISA/210) issued in PCT Application No. PCT/JP2015/076383 dated Nov. 2, 2015 with English-language translation (five (5) pages).

(Continued)

*Primary Examiner* — Sin J Lee
(74) *Attorney, Agent, or Firm* — Crowell & Moring LLP

(57) ABSTRACT

An electrolyte for a non-aqueous electrolyte battery includes a non-aqueous organic solvent and at least lithium hexafluorophosphate as a solute, characterized by further including 10 to 1000 mass ppm of a phosphorus-containing acidic compound and 0.01 to 10.0 mass % of a difluorophosphate. The phosphorus-containing acidic compound is preferably at least one selected from the group consisting of $HPF_6$, $HPO_2F_2$, $H_2PO_3F$ and $H_3PO_4$. By the use of such an electrolyte, it is possible to provide the non-aqueous electrolyte lithium battery capable of maintaining high discharge capacity even after repeated charge/discharge cycles under a high temperature environment.

4 Claims, No Drawings

(56) References Cited

FOREIGN PATENT DOCUMENTS

KR    2001-0006797 A    1/2001
WO    WO 2011/099585 A1    8/2011

OTHER PUBLICATIONS

Japanese-language Written Opinion (PCT/ISA/237) issued in PCT Application No. PCT/JP2015/076383 dated Nov. 2, 2015 (four (4) pages).
Extended European Search Report issued in counterpart European Application No. 15860161.7 dated May 2, 2018 (eight (8) pages).
Japanese-language Office Action issued in counterpart Japanese Application No. 2014-234152 dated Aug. 28, 2018 with English translation (12 pages).

* cited by examiner

ELECTROLYTE FOR NON-AQUEOUS ELECTROLYTE BATTERY AND NON-AQUEOUS ELECTROLYTE LITHIUM BATTERY

FIELD OF THE INVENTION

The present invention relates to an electrolyte for a non-aqueous electrolyte lithium battery and the like.

BACKGROUND ART

In recent years, attention has been focused on power storage systems for small, high energy density uses such as information-related equipment and communication equipment, and more specifically, personal computers, video cameras, digital still cameras, mobile phones and the like, and power storage systems for large, power uses such as auxiliary power sources for electric vehicles, hybrid vehicles and fuel cell vehicles, power facilities and the like.

As candidates for the power storage systems, there have been increasingly developed non-aqueous electrolyte lithium batteries including lithium ion batteries, lithium batteries and lithium ion capacitors. In the non-aqueous electrolyte lithium batteries, non-aqueous electrolytes, each prepared by dissolving a fluorine-containing electrolyte compound e.g. $LiPF_6$ in a solvent e.g. cyclic carbonate, chain carbonate or ether, are commonly used for high battery voltage and capacity. However, the non-aqueous electrolyte lithium batteries using those non-aqueous electrolytes do not always achieve satisfactory battery characteristics such as cycle characteristics and output characteristics.

The non-aqueous electrolyte lithium batteries currently in practical use have the possibility of significant deterioration in battery characteristics, e.g. extremely shortening of battery lifetime, due to electrolyte decomposition at electrode surfaces during charge/discharge cycles under an environment temperature exceeding 60° C. In particular, the batteries for auxiliary power sources for electric vehicles, hybrid vehicles and fuel cell vehicles, home power facilities etc. cause large heat generation during charge/discharge cycles because of their high capacity and output performance. Further, these batteries are used outdoors so that the environment temperature of the batteries tend to be high in summer. Thus, cooling mechanisms are provided to keep the environment temperature of the batteries at 60° C. or lower. However, the cooling mechanisms are also operated by energy from the batteries. There has accordingly been a demand to reduce the energy consumption of the cooling mechanisms, or to develop electrolytes for non-aqueous electrolyte lithium batteries usable at an environment temperature of higher than 60° C. so as to show less deterioration in battery characteristics during charge/discharge cycles under a high temperature environment of e.g. about 80° C. and thereby eliminate the need to use cooling mechanisms.

Patent Document 1 discloses that, in the case of using a non-aqueous electrolyte in which a fluorine-containing electrolyte compound e.g. $LiPF_6$ is dissolved in a solvent with the addition of lithium difluorophosphate, there occurs reaction of lithium difluorophosphate with electrode surfaces during initial charge/discharge cycles such that good coating films are formed on positive and negative electrodes so as to suppress reaction of the electrolyte solvent after the formation of the coating films and maintain battery discharge capacity after the storage for 20 days at 60° C. Patent Document 2 discloses that, in the case of using a $LiPF_6$-containing electrolyte with the addition of a difluorophosphate salt, the battery shows improved output performance even after repeated charge/discharge cycles under an environment of 60° C. The addition of lithium difluorophosphate is in fact effective in improving battery cycle characteristics, but does not succeed in achieving sufficient battery cycle characteristics under a high temperature environment of about 80° C.

Further, Non-Patent Document 1 discloses that, in the case of using $LiPF_6$ as an electrolyte salt in a lithium ion battery (lithium secondary battery), $LiPF_6$ is decomposed by moisture absorption to form acidic components such as HF, $POF_3$, $H(OPOF_2)$, $H_2(O_2POF)$ and $H_3(PO_4)$ that adversely affect battery characteristics.

PRIOR ART DOCUMENTS

Patent Documents

Patent Document 1: Japanese Laid-Open Patent Publication No. H11-67270 (also published as Japanese Patent No. 3439085)

Patent Document 2: Japanese Laid-Open Patent Publication No. 2004-031079 (also published as Japanese Patent No. 4233819)

Non-Patent Documents

Non-Patent Document 1: Kunitaka MOMOTA, "Battery Technology", The Electrochemical Society of Japan, vol. 8 (1996), p. 108-117

SUMMARY OF THE INVENTION

Problems to be Solved by the Invention

It is an object of the present invention to provide an electrolyte for a non-aqueous battery and a non-aqueous electrolyte lithium battery, capable of maintaining high discharge capacity even after repeated charge/discharge cycles under a high temperature environment.

Means for Solving the Problems

The present inventors have made extensive researches in view of the above circumstances. In the case of an electrolyte for a non-aqueous electrolyte battery containing a non-aqueous organic solvent and at least lithium hexafluorophosphate as a solute, it has conventionally been supposed that the presence of an acidic compound in the electrolyte would cause degradation of battery materials such as positive electrode active material. Contrary to this supposition, the present inventors have found as a result of the extensive researches that it is possible to effectively improve the cycle characteristics of the battery under a high temperature environment by adding a phosphorus-containing acidic compound within a specific concentration range and further adding a difluorophosphate as an additive to the electrolyte. The present invention is based on such a finding.

Namely, there is provided according to the present invention an electrolyte for a non-aqueous electrolyte battery, comprising: a non-aqueous organic solvent; and at least lithium hexafluorophosphate as a solute, wherein the electrolyte for the non-aqueous electrolyte battery further comprises 10 to 1000 mass ppm of a phosphorus-containing acidic compound and 0.01 to 10.0 mass % of a difluorophosphate.

The phosphorus-containing acidic compound is preferably at least one selected from $HPF_6$, $HPO_2F_2$, $H_2PO_3F$ and $H_3PO_4$. Further, it is preferable that the amount of hydrogen fluoride contained in the electrolyte is less than 10 mass ppm.

The electrolyte for the non-aqueous electrolyte battery may further contain: at least one compound selected from the group consisting of lithium difluorobis(oxalato)phosphate, lithium difluoro(oxalato)borate, lithium tris(oxalato)phosphate, lithium tetrafluoro(oxalato)phosphate, sodium difluorobis(oxalato)phosphate, potassium difluorobis(oxalato)phosphate, vinylene carbonate, vinylethylene carbonate, ethynylethylene carbonate, fluoroethylene carbonate and dimethylvinylene carbonate as an additive for negative electrode coating formation; at least one compound selected from the group consisting of propanesultone, 1,3-propenesultone, methylene methane disulfonate, dimethylene methane disulfonate and trimethylene methane disulfonate as an additive for positive electrode protection; and at least one compound selected from the group consisting of cyclohexylbenzene, tert-butylbenzene, tert-amylbenzene, biphenyl, o-terphenyl, 4-fluorobiphenyl, fluorobenzene, 2,4-difluorobenzene and difluoroanisole as an additive for overcharge prevention.

There is also provided according to the present invention a non-aqueous electrolyte lithium battery, comprising at least a positive electrode, a negative electrode and the above-mentioned electrolyte for the non-aqueous electrolyte battery.

The electrolyte for the non-aqueous electrolyte battery and the non-aqueous electrolyte lithium battery according to the present invention maintain high discharge capacity even after repeated charge/discharge cycles under a high temperature environment.

DETAILED DESCRIPTION OF THE EMBODIMENTS

The respective configurations of the following embodiment, and combination thereof, are merely examples. Addition, omission or replacement of any configuration can be made without departing from the scope of the present invention. The scope of the present invention is not limited to the following embodiment and is defined only by the appended claims.

<Electrolyte for Non-Aqueous Electrolyte Battery>

An electrolyte for a non-aqueous electrolyte battery according to the present invention includes a phosphorus-containing acidic compound (hereinafter sometimes simply referred to as "acidic compound"), a difluorophosphate, a solute and a non-aqueous organic solvent dissolving therein the acidic component, the difluorophosphate and the solute.

<Acidic Compound>

In the electrolyte for the non-aqueous electrolyte battery according to the present invention, the phosphorus-containing acidic compound is preferably at least one selected from $HPF_6$, $HPO_2F_2$, $H_2PO_3F$ and $H_3PO_4$. The amount of the acidic compound contained relative to the total amount of the electrolyte for the non-aqueous electrolyte battery is generally 10 mass ppm or more, preferably 30 mass ppm or more, more preferably 50 mass ppm or more, and is generally 1000 mass ppm or less, preferably 800 mass ppm or less, more preferably 500 mass ppm or less. When the amount of the acidic compound contained is less than 10 mass ppm, it may not be possible to obtain sufficient improvement in the cycle characteristics of the non-aqueous electrolyte battery under a high temperature environment. When the amount of the acidic compound contained exceeds 1000 mass ppm, there may occur an adverse effect on the cycle characteristics of the battery by degradation of battery materials such as positive electrode active material. Furthermore, hydrogen fluoride is not preferred because battery materials such as positive electrode active material are significantly degraded by hydrogen fluoride. It is thus preferable in the present invention that the non-aqueous electrolyte contains substantially no hydrogen fluoride. The expression "substantially no hydrogen fluoride" means that the amount of hydrogen fluoride contained in the non-aqueous electrolyte is less than 10 mass ppm. The amount of hydrogen fluoride contained in the electrolyte is more preferably less than 8 mass ppm, still more preferably less than 5 ppm.

<Method for Addition of Acidic Compound>

In order to let the electrolyte for the non-aqueous electrolyte battery contain the acidic compound, the acidic compound may be directly added into the electrolyte. In order to let the electrolyte for the non-aqueous electrolyte battery contain at least one compound selected from $HPF_6$, $HPO_2F_2$, $H_2PO_3F$ and $H_3PO_4$, it is feasible to add a small amount (e.g. 1 to 1000 mass ppm) of water to an non-aqueous organic solvent containing $LiPF_6$, thereby forming the phosphorus-containing acidic compound by hydrolysis of $LiPF_6$ in the non-aqueous organic solvent, and then, add the non-aqueous organic solvent with the acidic compound to the electrolyte although the acidic compound may be directly added to the electrolyte. In this case, however, hydrogen fluoride is also formed. It is thus necessary to, before addition to the electrolyte for the non-aqueous electrolyte battery, remove the hydrogen fluoride by e.g degassing from the non-aqueous organic solvent in which the phosphorus-containing acidic compound has been formed by hydrolysis of $LiPF_6$.

<Method for Quantification of Acidic Compound in Electrolyte for Non-Aqueous Electrolyte Battery>

The total amount of free acid contained in the electrolyte for the non-aqueous electrolyte battery can be measured by neutralization titration. It is feasible to quantify the content amount of any acidic compound other than HF by quantifying the amount of HF contained in the electrolyte for the non-aqueous electrolyte battery and then subtracting the HF amount from the total free acid amount.

Further, the respective amounts of $HPO_2F_2$ and $H_2PO_3F$ contained in the electrolyte for the non-aqueous electrolyte battery can be quantified by $^{19}F$-NMR. Since the $^{19}F$-NMR values (ppm) of $HPO_2F_2$ and $H_2PO_3F$ have been discussed as follows in various reports published before the filing of the present application, it is feasible to quantify the content amounts of $HPO_2F_2$ and $H_2PO_3F$ from the NMR peak areas of these acidic compounds, respectively.

HF: −201.0
$HPO_2F_2$: −86.2, −86.0, −85.6
$H_2PO_3F$: −74.3, −74.0

It is also feasible to quantify the content amounts of $HPO_2F_2$, $H_2PO_3F$ and $H_3PO_4$ by ion chromatographic measurement of the amounts of anions of these acidic compounds contained in the electrolyte for the non-aqueous electrolyte battery, respectively.

<Difluorophosphate>

As the difluorophosphate, there can be used a lithium salt, sodium salt, potassium salt or quaternary alkyl ammonium salt of difluorophosphoric acid. There is no particular limitation on the quaternary alkyl ammonium ion of the ammonium salt. Examples of the quaternary alkyl ammonium ion are trimethyl propyl ammonium ion, 1-butyl-1-methyl pyrrolidinium ion and the like. In the case where the electrolyte is for use in a non-aqueous electrolyte lithium battery, it is preferable to use lithium difluorophosphate.

The lower limit of the amount of the difluorophosphate contained relative to the total amount of the electrolyte for the non-aqueous electrolyte battery is generally 0.01 mass % or more, preferably 0.03 mass % or more, more preferably 0.05 mass % or more. The upper limit of the amount of the difluorophosphate contained relative to the total amount of the electrolyte for the non-aqueous electrolyte battery is generally 10.0 mass % or less, preferably 3.0 mass % or less, more preferably 2.0 mass % or less. When the amount of the difluorophosphate contained is less than 0.01 mass %, it may not be possible to obtain sufficient improvement in the cycle characteristics of the non-aqueous electrolyte battery. When the amount of the difluorophosphate contained exceeds 10.0 mass %, the electrolyte for the non-aqueous electrolyte battery becomes high in viscosity and thereby may cause decrease of ion conductivity and increase of internal resistance.

The reason for improvement in the cycle characteristics of the non-aqueous electrolyte battery under a high temperature environment by the coexistence of the certain amounts of the acidic compound and the difluorophosphate in the electrolyte according to the present invention is not clear but is assumed as follows. It should however be understood that the present invention is not limited to the following action principles.

It is known that, when the difluorophosphate is added to the electrolyte, the difluorophosphate and the electrolyte solvent react with electrodes during initial charge/discharge cycles such that coating films are formed from decomposition products of the difluorophosphate and the electrolyte solvent on electrode surfaces so as to suppress reaction of the electrolyte solvent after the formation of the coating films and improve the cycle characteristics of the battery.

It is assumed that, in the case where the certain amount of the acidic compound is used in combination with the difluorophosphate, it is possible to promote the reaction of the difluorophosphate and the electrodes and thereby form good coating films, which are less likely to be degraded under a high temperature environment, on electrodes as compared to the case where the difluorophosphate is used solely. The use of HF as the acidic compound is however not preferred because HF causes significant degradation of battery materials such as positive electrode active material.

<Solute>

In the electrolyte for the non-aqueous electrolyte battery according to the present invention, at least lithium hexafluorophosphate ($LiPF_6$) is used as the solute. Any other lithium salt may be added as needed in an arbitrary amount within the range that does not impair the effects of the present invention. Examples of the other lithium salt are $LiBF_4$, $LiClO_4$, $LiAsF_6$, $LiSbF_6$, $LiCF_3SO_3$, $LiN(SO_2CF_3)_2$, $LiN(SO_2C_2F_5)_2$, $LiN(SO_2CF_3)(SO_2C_4F_9)$, $LiC(SO_2CF_3)_3$, $LiPF_3(C_3F_7)_3$, $LiB(CF_3)_4$ and $LiBF_3(C_2F_5)$. As for these solutes, one kind may be used alone, or two or more kinds may be used in arbitrary combination at an arbitrary ratio.

There is no particular limitation on the amount of the solute including at least $LiPF_6$. The lower limit of the amount of the solute contained in the electrolyte is generally 0.5 mol/L or more, preferably 0.7 mol/L or more, more preferably 0.9 mol/L or more. The upper limit of the amount of the solute contained in the electrolyte is generally 2.5 mol/L or less, preferably 2.2 mol/L or less, more preferably 2.0 mol/L or less. When the amount of the solute contained is less than 0.5 mol/L, the cycle and output characteristics of the non-aqueous electrolyte battery may be lowered due to decrease of ion conductivity. When the amount of the solute contained exceeds 2.5 mol/L, the electrolyte for the non-aqueous electrolyte battery becomes high in viscosity so that the cycle and output characteristics of the non-aqueous electrolyte battery may be lowered due to decrease of ion conductivity.

<Non-Aqueous Organic Solvent>

There is no particular limitation on the kind of the non-aqueous organic solvent as long as the non-aqueous organic solvent is an aprotic solvent capable of dissolving therein the solute, the acidic compound and the difluorophosphate according to the present invention. There can be used any of carbonates, esters, ethers, lactones, nitriles, imides, sulfones etc. The solvent can be a single solvent or a mixed solvent of two or more kinds of solvents. Examples of the non-aqueous organic solvent are ethyl methyl carbonate, dimethyl carbonate, diethyl carbonate, methyl propyl carbonate, ethyl propyl carbonate, methyl butyl carbonate, ethylene carbonate, propylene carbonate, butylene carbonate, methyl acetate, ethyl acetate, methyl propionate, ethyl propionate, diethyl ether, acetonitrile, propionitrile, tetrahydrofuran, 2-methyltetrahydrofuran, furan, tetrahydropyrane, 1,3-dioxane, 1,4-dioxane, dibutyl ether, diisopropyl ether, 1,2-dimethoxyethane, N,N-dimethylformamide, dimethyl sulfoxide, sulfolane, γ-butyrolactone, and γ-valerolactone.

Preferably, the non-aqueous organic solvent contains at least one kind selected from the group consisting of cyclic carbonates and chain carbonates. Examples of the cyclic carbonates are ethylene carbonate and propylene carbonate. Examples of the chain carbonates are ethyl methyl carbonate, dimethyl carbonate, diethyl carbonate and methyl propyl carbonate.

<Other Additives>

As mentioned above, the certain amounts of the acidic compound, the difluorophosphate and the solute are contained in the electrolyte for the non-aqueous electrolyte battery according to the present invention. In the electrolyte for the non-aqueous electrolyte battery according to the present invention, any other commonly available additive may be contained at an arbitrary ratio within the range that does not impair the effects of the present invention. As such additives, there can be used a negative electrode coating formation additive capable of being reduced during initial charge to form a coating film on a negative electrode surface, a positive electrode protection additive capable of forming a protective coating film on a positive electrode surface during initial charge and an overcharge prevention additive capable of, in an overcharge state, being reduced to stop reaction of the electrolyte.

Examples of the negative electrode coating formation additive are lithium difluorobis(oxalato)phosphate, lithium difluoro(oxalato)borate, lithium tris(oxalato)phosphate, lithium tetrafluoro(oxalato)phosphate, sodium difluorobis(oxalato)phosphate, potassium difluorobis(oxalato)phosphate, vinylene carbonate, vinylethylene carbonate, ethynylethylene carbonate, fluoroethylene carbonate and dimethylvinylene carbonate.

Examples of the positive electrode protection additive are propanesultone, 1,3-propenesultone, methylene methane disulfonate, dimethylene methane disulfonate and trimethylene methane disulfonate.

Examples of the overcharge prevention additive are cyclohexylbenzene, tert-butylbenzene, tert-amylbenzene, biphenyl, o-terphenyl, 4-fluorobiphenyl, fluorobenzene, 2,4-difluorobenzene and difluoroanisole.

<Non-Aqueous Electrolyte Lithium Battery>

Next, a non-aqueous electrolyte lithium battery according to the present invention will be explained below. The non-aqueous electrolyte lithium battery according to the present invention is characterized by using the above-mentioned electrolyte for the non-aqueous electrolyte battery according to the present invention. The other structural components can be of the types commonly used for non-aqueous electrolyte lithium batteries. Namely, the non-aqueous electrolyte lithium battery according to the present invention has positive and negative electrodes capable of absorbing and desorbing lithium, collectors, a separator and a container.

There is no particular limitation on the kind of the negative electrode material. Examples of the negative electrode material are: lithium metal; alloys or intermetallic compounds of lithium and other metals; various carbon materials (such as synthetic graphite, natural graphite etc.); metal oxides; metal nitrides; tin (as simple substance); tin compounds; silicon (as simple substance); silicon compounds; activated carbons; and conductive polymers. The carbon materials include graphitizable carbon, non-graphitizable carbon (hard carbon) with a (002) plane spacing of 0.37 nm or more, and graphite with a (002) plane spacing of 0.34 nm or less. Specific examples of the carbon materials are pyrolytic carbon, coke, glassy carbon fiber, sintered organic polymer substance, activated carbon and carbon black. As the coke, there can be used pitch coke, needle coke, petroleum coke etc. Herein, the sintered organic polymer substance refers to substance obtained by sintering and carbonizing phenol resin or furan resin at an appropriate temperature. Among others, the carbon material is preferred in view of the fact that the carbon material shows a very little change of crystalline structure by absorption and desorption of lithium and thereby provides a high energy density and good cycle characteristics. The carbon material can be in any form such as fibrous form, spherical form, particular form or scaly form. Amorphous carbon material, or graphite material having a surface coated with amorphous carbon, is more preferred in terms of low reactivity between the material surface and the electrolyte.

There is also no particular limitation on the kind of the positive electrode material. Examples of the positive electrode material are: lithium-containing transition metal composite oxides such as $LiCoO_2$, $LiNiO_2$, $LiMnO_2$ and $LiMn_2O_4$; those in which a plurality of transition metals are mixed in the above lithium-containing transition metal composite oxides; those in which part of transition metal elements of the above lithium-containing transition metal composite oxides are replaced with other metal elements; oxides such as $TiO_2$, $V_2O_5$ and $MoO_3$; sulfides such as $TiS_2$ and FeS; conductive polymers such as polyacetylene, poly(p-phenylene), polyaniline and polypyrrole; activated carbons; polymers capable of generating radicals; and carbon materials.

A conductive agent such as acetylene black, ketjen black, carbon fibers or graphite, a binder such as polytetrafluoroethylene, polyvinylidene fluoride, SBR resin, polyimide, aramid resin or polyacrylic acid, and a viscosity modifier such as CMC are added to the respective positive and negative electrode materials. The resulting electrode material compositions are each formed into a sheet shape and thus are provided as electrode sheets.

As the separator for prevention contact between the positive electrode and the negative electrode, there can be used a nonwoven fabric or porous sheet of polypropylene, polyethylene, paper, glass fibers or the like.

Using the above battery components, the non-aqueous electrolyte lithium battery is assembled as a coin type, cylindrical type, rectangular type or aluminum laminate type battery.

EXAMPLES

The present invention will be described in more detail below by way of the following examples. It should however be understood that the following examples are not intended to limit the present invention thereto.

Example 1

A non-aqueous electrolyte was prepared by adding 1.2 mol/L of $LiPF_6$ as a solute, 1.0 mass % of lithium difluorophosphate and 20 mass ppm of $HPF_6$ as an acidic compound to a mixed solvent of ethylene carbonate and ethyl methyl carbonate at a volume ratio of 1:2. Herein, the acidic compound was added in the form of a solution of 60 mass % $HPF_6$ in ethyl methyl carbonate. It was confirmed by $^{19}$F-NRM analysis that the concentration of hydrogen fluoride in the electrolyte was less than 10 mass ppm. In the after-mentioned Examples 2-24 and Comparative Examples 1-4 and 6-16, it was confirmed by the same procedure that the concentration of hydrogen fluoride in the electrolyte was less than 10 mass ppm.

Using this electrolyte, $LiCoO_2$ as a positive electrode material and graphite as a negative electrode material, a battery cell was produced as a test sample and evaluated by actual battery charge/discharge test. The production procedure of the sample cell was as follows.

First, 90 parts by weight of a $LiCoO_2$ powder was mixed with 5 parts by weight of polyvinylidene fluoride (PVDF) as a binder and 5 parts by weight of acetylene black. This mixture was formed into a paste with the addition of N-methylpyrrolidone. The paste was applied to an aluminum foil and dried, thereby obtaining a sample positive electrode. Further, 90 parts by weight of a graphite powder was mixed with 10 parts by weight of polyvinylidene fluoride (PVDF) as a binder. This mixture was formed into a slurry with the addition of N-methylpyrrolidone. The slurry was applied to a copper foil and dried for 12 hours at 150° C., thereby obtaining a sample negative electrode.

The sample cell was formed with a capacity of 1.6 mAh by assembling the above-obtained positive and negative electrodes into a CR2032 coin-type cell unit while sandwiching therebetween a cellulose separator impregnated with the above-prepared electrolyte.

The battery charge/discharge test of the thus-formed cell was carried out under an environment temperature of 80° C. by repeating charge/discharge cycles at a charge/discharge rate of 3C. In the test, the cell was charged to 4.2 V and maintained at 4.2 V for 1 hour during the charge cycle operation; and the cell was discharged to 3.0V during the discharge cycle operation. Then, the degree of deterioration in the discharge capacity retention rate of the cell after 500 cycles was determined in terms of the percentage of the discharge capacity after 500 cycles with respect to the initial discharge capacity.

Example 2

A sample cell was produced and evaluated by charge/discharge test in the same manner as in Example 1, except that the concentration of $HPF_6$ in the electrolyte was set to 200 mass ppm.

Example 3

A sample cell was produced and evaluated by charge/discharge test in the same manner as in Example 1, except that the concentration of $HPF_6$ in the electrolyte was set to 900 mass ppm.

Example 4

A sample cell was produced and evaluated by charge/discharge test in the same manner as in Example 1, except that $HPO_2F_2$ was used as the acidic compound in the electrolyte.

Example 5

A sample cell was produced and evaluated by charge/discharge test in the same manner as in Example 1, except that: $HPO_2F_2$ was used as the acidic compound in the electrolyte; and the concentration of the acidic compound in the electrolyte was set to 200 mass ppm.

Example 6

A sample cell was produced and evaluated by charge/discharge test in the same manner as in Example 1, except that: $HPO_2F_2$ was used as the acidic compound in the electrolyte; and the concentration of the acidic compound in the electrolyte was set to 900 mass ppm.

Example 7

A sample cell was produced and evaluated by charge/discharge test in the same manner as in Example 1, except that $H_2PO_3F$ was used as the acidic compound in the electrolyte.

Example 8

A sample cell was produced and evaluated by charge/discharge test in the same manner as in Example 1, except that: $H_2PO_3F$ was used as the acidic compound in the electrolyte; and the concentration of the acidic compound in the electrolyte was set to 200 mass ppm.

Example 9

A sample cell was produced and evaluated by charge/discharge test in the same manner as in Example 1, except that: $H_2PO_3F$ was used as the acidic compound in the electrolyte; and the concentration of the acidic compound in the electrolyte was set to 900 mass ppm.

Example 10

A sample cell was produced and evaluated by charge/discharge test in the same manner as in Example 1, except that $H_3PO_4$ was used as the acidic compound in the electrolyte.

Example 11

A sample cell was produced and evaluated by charge/discharge test in the same manner as in Example 1, except that: $H_3PO_4$ was used as the acidic compound in the electrolyte; and the concentration of the acidic compound in the electrolyte was set to 200 mass ppm.

Example 12

A sample cell was produced and evaluated by charge/discharge test in the same manner as in Example 1, except that: $H_3PO_4$ was used as the acidic compound in the electrolyte; and the concentration of the acidic compound in the electrolyte was set to 900 mass ppm.

Example 13

A sample cell was produced and evaluated by charge/discharge test in the same manner as in Example 1, except that: 0.5 mass % of lithium difluorobis(oxalato)phosphate was further added to the electrolyte; and the concentration of $HPF_6$ as the acidic compound in the electrolyte was set to 200 mass ppm.

Example 14

A sample cell was produced and evaluated by charge/discharge test in the same manner as in Example 1, except that: 1 mass % of lithium difluoro(oxalato)borate was further added to the electrolyte; and the concentration of $HPF_6$ as the acidic compound in the electrolyte was set to 200 mass ppm.

Example 15

A sample cell was produced and evaluated by charge/discharge test in the same manner as in Example 1, except that: the concentration of lithium difluorophosphate in the electrolyte was set to 0.5 mass %; 0.03 mass % of lithium bis(oxalato)borate was further added to the electrolyte; and the concentration of $HPF_6$ as the acidic compound in the electrolyte was set to 200 mass ppm.

Example 16

A sample cell was produced and evaluated by charge/discharge test in the same manner as in Example 1, except that: the concentration of lithium difluorophosphate in the electrolyte was set to 0.5 mass %; 0.05 mass % of lithium tris(oxalato)borate was further added to the electrolyte; and the concentration of $HPF_6$ as the acidic compound in the electrolyte was set to 200 mass ppm.

Example 17

A sample cell was produced and evaluated by charge/discharge test in the same manner as in Example 1, except that: 0.5 mass % of lithium tetrafluoro(oxalato)phosphate was further added to the electrolyte; and the concentration of $HPF_6$ as the acidic compound in the electrolyte was set to 200 mass ppm.

Example 18

A sample cell was produced and evaluated by charge/discharge test in the same manner as in Example 1, except that: 1 mass % of vinylene carbonate was further added to the electrolyte; and the concentration of $HPF_6$ as the acidic compound in the electrolyte was set to 200 mass ppm.

Example 19

A sample cell was produced and evaluated by charge/discharge test in the same manner as in Example 1, except that: 1 mass % of tert-amylbenzene was further added to the electrolyte; and the concentration of $HPF_6$ as the acidic compound in the electrolyte was set to 200 mass ppm.

Example 20

A sample cell was produced and evaluated by charge/discharge test in the same manner as in Example 1, except that: 1 mass % of 1,3-propenesultone was further added to the electrolyte; and the concentration of $HPF_6$ as the acidic compound in the electrolyte was set to 200 mass ppm.

Example 21

A sample cell was produced and evaluated by charge/discharge test in the same manner as in Example 1, except that: 1 mass % of methylene methane disulfonate was further added to the electrolyte; and the concentration of $HPF_6$ as the acidic compound in the electrolyte was set to 200 mass ppm.

Example 22

A sample cell was produced and evaluated by charge/discharge test in the same manner as in Example 1, except that: the concentration of lithium difluorophosphate in the electrolyte was set to 0.01 mass %; and the concentration of $HPF_6$ as the acidic compound in the electrolyte was set to 200 mass ppm.

Example 23

A sample cell was produced and evaluated by charge/discharge test in the same manner as in Example 1, except that: the concentration of lithium difluorophosphate in the electrolyte was set to 10 mass %; and the concentration of $HPF_6$ as the acidic compound in the electrolyte was set to 200 mass ppm.

Example 24

To a solution of 30 mass % $LiPF_6$ in ethyl methyl carbonate, 100 mass ppm of water was added. The resulting solution was left for 1 day at room temperature. After that, HF was removed from the solution by maintaining the solution for 5 hours at room temperature under a reduced pressure of 0.06 to 0.08 MPa in terms of absolute pressure. Using this $LiPF_6$ solution, a electrolyte was prepared such that 1.2 mol/L of $LiPF_6$ as a solute and 1.0 mass % of lithium difluorophosphate were dissolved in a mixed solvent of ethylene carbonate and ethyl methyl carbonate at a volume ratio of 1:2.

The total amount of free acid contained in the electrolyte was determined by neutralization titration to be 213 mass ppm in terms of $HPF_6$. Further, the concentration of hydrogen fluoride in the electrolyte was determined by $^{19}$N-NMR to be 3 mass ppm. It was confirmed by these measurement results that the amount of a phosphorus-containing acidic compound generated by hydrolysis of $LiPF_6$ and contained in the electrolyte was 191 mass ppm in terms of $PF_6$.

A sample cell was produced and evaluated by charge/discharge test in the same manner as in Example 1, except that the above-prepared electrolyte was used.

Comparative Example 1

A sample cell was produced and evaluated by charge/discharge test in the same manner as in Example 1, except that: lithium difluorophosphate was not added to the electrolyte.

Comparative Example 2

A sample cell was produced and evaluated by charge/discharge test in the same manner as in Example 1, except that: lithium difluorophosphate was not added to the electrolyte; and the concentration of $HPF_6$ as the acidic compound in the electrolyte was set to 200 mass ppm.

Comparative Example 3

A sample cell was produced and evaluated by charge/discharge test in the same manner as in Example 1, except that $HPF_6$ as the acidic compound was not added to the electrolyte.

Comparative Example 4

A sample cell was produced and evaluated by charge/discharge test in the same manner as in Example 1, except that the concentration of $HPF_6$ as the acidic compound in the electrolyte was set to 1200 mass ppm.

Comparative Example 5

A sample cell was produced and evaluated by charge/discharge test in the same manner as in Example 1, except that 100 mass ppm of HF was added to the electrolyte in place of $HPF_6$.

Comparative Example 6

A sample cell was produced and evaluated by charge/discharge test in the same manner as in Example 13, except that $HPF_6$ as the acidic compound was not added to the electrolyte.

Comparative Example 7

A sample cell was produced and evaluated by charge/discharge test in the same manner as in Example 14, except that $HPF_6$ as the acidic compound was not added to the electrolyte.

Comparative Example 8

A sample cell was produced and evaluated by charge/discharge test in the same manner as in Example 15, except that $HPF_6$ as the acidic compound was not added to the electrolyte.

Comparative Example 9

A sample cell was produced and evaluated by charge/discharge test in the same manner as in Example 16, except that $HPF_6$ as the acidic compound was not added to the electrolyte.

Comparative Example 10

A sample cell was produced and evaluated by charge/discharge test in the same manner as in Example 17, except that $HPF_6$ as the acidic compound was not added to the electrolyte.

Comparative Example 11

A sample cell was produced and evaluated by charge/discharge test in the same manner as in Example 18, except that $HPF_6$ as the acidic compound was not added to the electrolyte.

Comparative Example 12

A sample cell was produced and evaluated by charge/discharge test in the same manner as in Example 19, except that $HPF_6$ as the acidic compound was not added to the electrolyte.

Comparative Example 13

A sample cell was produced and evaluated by charge/discharge test in the same manner as in Example 20, except that $HPF_6$ as the acidic compound was not added to the electrolyte.

Comparative Example 14

A sample cell was produced and evaluated by charge/discharge test in the same manner as in Example 21, except that $HPF_6$ as the acidic compound was not added to the electrolyte.

Comparative Example 15

A sample cell was produced and evaluated by charge/discharge test in the same manner as in Example 22, except that $HPF_6$ as the acidic compound was not added to the electrolyte.

Comparative Example 16

A sample cell was produced and evaluated by charge/discharge test in the same manner as in Example 23, except that $HPF_6$ as the acidic compound was not added to the electrolyte.

The results of Examples 1 to 24 are indicated in TABLE 1. The results of Comparative Examples 1 to 16 are indicated in TABLE 2.

TABLE 1

| | Acidic compound/ Concentration (mass ppm) | Additive/ Concentration (mass %) | Other additive/ Concentration (mass %) | Capacity retention rate (%) after cycle test |
|---|---|---|---|---|
| Example 1 | $HPF_6$/20 | lithium difluorophosphate/1 | —/0 | 53 |
| Example 2 | $HPF_6$/200 | lithium difluorophosphate/1 | —/0 | 56 |
| Example 3 | $HPF_6$/900 | lithium difluorophosphate/1 | —/0 | 47 |
| Example 4 | $HPO_2F_2$/20 | lithium difluorophosphate/1 | —/0 | 52 |
| Example 5 | $HPO_2F_2$/200 | lithium difluorophosphate/1 | —/0 | 55 |
| Example 6 | $HPO_2F_2$/900 | lithium difluorophosphate/1 | —/0 | 48 |
| Example 7 | $H_2PO_3F$/20 | lithium difluorophosphate/1 | —/0 | 52 |
| Example 8 | $H_2PO_3F$/200 | lithium difluorophosphate/1 | —/0 | 54 |
| Example 9 | $H_2PO_3F$/900 | lithium difluorophosphate/1 | —/0 | 46 |
| Example 10 | $H_3PO_4$/20 | lithium difluorophosphate/1 | —/0 | 50 |
| Example 11 | $H_3PO_4$/200 | lithium difluorophosphate/1 | —/0 | 52 |
| Example 12 | $H_3PO_4$/900 | lithium difluorophosphate/1 | —/0 | 47 |
| Example 13 | $HPF_6$/200 | lithium difluorophosphate/1 | lithium difluorobis(oxalato)phosphate/0.5 | 66 |
| Example 14 | $HPF_6$/200 | lithium difluorophosphate/1 | lithium difluoro(oxalato)borate/1 | 71 |
| Example 15 | $HPF_6$/200 | lithium difluorophosphate/0.5 | lithium bis(oxalato)borate/0.03 | 61 |
| Example 16 | $HPF_6$/200 | lithium difluorophosphate/0.5 | lithium tris(oxalato)borate/0.05 | 66 |
| Example 17 | $HPF_6$/200 | lithium difluorophosphate/1 | lithium tetrafluoro(oxalato)phosphate ?/0.5 | 64 |
| Example 18 | $HPF_6$/200 | lithium difluorophosphate/1 | vinylene carbonate/1 | 56 |
| Example 19 | $HPF_6$/200 | lithium difluorophosphate/1 | tert-amylbenzene/1 | 55 |
| Example 20 | $HPF_6$/200 | lithium difluorophosphate/1 | 1,3-propenesultone/1 | 60 |
| Example 21 | $HPF_6$/200 | lithium difluorophosphate//1 | methylene methane disulfonate/1 | 62 |

TABLE 1-continued

|  | Acidic compound/ Concentration (mass ppm) | Additive/ Concentration (mass %) | Other additive/ Concentration (mass %) | Capacity retention rate (%) after cycle test |
|---|---|---|---|---|
| Example 22 | HPF$_6$/200 | lithium difluorophosphate/ 0.01 | —/0 | 30 |
| Example 23 | HPF$_6$/200 | lithium difluorophosphate/ 10 | —/0 | 58 |
| Example 24 | phosphorus-containing compound/ 191 (in terms of HPF$_6$) | lithium difluorophosphate// 1 | —/0 | 57 |

TABLE 2

|  | Acidic compound/ Concentration (mass ppm) | Additive/ Concentration (mass %) | Other additive/ Concentration (mass %) | Capacity retention rate (%) after cycle test |
|---|---|---|---|---|
| Comparative Example 1 | —/0 | —/0 | —/0 | 25 |
| Comparative Example 2 | HPF$_6$/200 | —/0 | —/0 | 20 |
| Comparative Example 3 | —/0 | lithium difluorophosphate/ 1 | —/0 | 45 |
| Comparative Example 4 | HPF$_6$/1200 | lithium difluorophosphate/ 1 | —/0 | 40 |
| Comparative Example 5 | HF/100 | lithium difluorophosphate/ 1 | —/0 | 38 |
| Comparative Example 6 | —/0 | lithium difluorophosphate/ 1 | lithium difluorobis(oxalato)phosphate/ 0.5 | 55 |
| Comparative Example 7 | —/0 | lithium difluorophosphate/ 1 | lithium difluoro(oxalato)borate/ 1 | 60 |
| Comparative Example 8 | —/0 | lithium difluorophosphate/ 1 | lithium bis(oxalato)borate/0.03 | 50 |
| Comparative Example 9 | —/0 | lithium difluorophosphate/ 1 | lithium tris(oxalato)phosphate/0.05 | 55 |
| Comparative Example 10 | —/0 | lithium difluorophosphate/ 1 | lithium tetrafluoro(oxalato)phosphate/ 0.5 | 53 |
| Comparative Example 11 | —/0 | lithium difluorophosphate/ 1 | vinylene carbonate/1 | 45 |
| Comparative Example 12 | —/0 | lithium difluorophosphate/ 1 | tert-amylbenzene/1 | 44 |
| Comparative Example 13 | —/0 | lithium difluorophosphate/ 1 | 1,3-propenesultone/1 | 49 |
| Comparative Example 14 | —/0 | lithium difluorophosphate/ 1 | methylene methane disulfonate/1 | 51 |
| Comparative Example 15 | —/0 | lithium difluorophosphate/ 0.1 | —/0 | 28 |
| Comparative Example 16 | —/0 | lithium difluorophosphate/ 10 | —/0 | 47 |

As is seen from comparison of the above results, the capacity retention rate after the cycle test under a high temperature environment of 80° C. was higher in Examples 1 to 12, in each of which the phosphorus-containing acidic compound and lithium difluorophosphate were used in combination within the specific concentration ranges, than in Comparative Example 3 in which lithium difluorophosphate was used solely. In Comparative Example 2 in which the acidic compound was used solely without combination with lithium difluorophosphate, the capacity retention rate was low. On the other hand, the capacity retention rate was lower in Comparative Example 5 in which 100 mass ppm of HF was contained than in Comparative Example 3.

Further, the capacity retention rate was improved in Examples 13-21 in which lithium difluorobis(oxalato)phosphate, lithium difluoro(oxalato)borate, lithium bis(oxalato)borate, lithium tris(oxalato)phosphate, lithium tetrafluoro(oxalato)phosphate, vinylene carbonate, tert-amylbenzene, 1,3-propenesultone or methylene methane disulfonate was used as the other additive as compared to Comparative Examples 6 to 14 in which no acidic compound was added.

It is thus evident from the above results that, as compared to the case of using lithium difluorophosphate solely as the additive, it is possible to obtain an epoch-making effect of improving the cycle characteristics of the battery under a high temperature environment by using the specific concentration ranges of the phosphorus-containing acidic compound and lithium difluorophosphate in combination.

The invention claimed is:

1. An electrolyte for a non-aqueous electrolyte battery, comprising a non-aqueous organic solvent and at least lithium hexafluorophosphate as a solute,
    wherein the electrolyte further comprises 10 to 1000 mass ppm of a phosphorus-containing acidic compound and 0.01 to 10.0 mass % of a difluorophosphate;
    wherein the phosphorus-containing acidic compound is HPF$_6$; and
    wherein hydrogen fluoride is contained in an amount of less than 10 mass ppm in the electrolyte.

2. The electrolyte for the non-aqueous electrolyte battery according to claim 1, further comprising:

as an additive for negative electrode coating formation, at least one compound selected from the group consisting of lithium difluorobis(oxalato)phosphate, lithium difluoro(oxalato)borate, lithium tris(oxalato)phosphate, lithium tetrafluoro(oxalato)phosphate, sodium difluorobis(oxalato)phosphate, potassium difluorobis(oxalato)phosphate, vinylene carbonate, vinylethylene carbonate, ethynylethylene carbonate, fluoroethylene carbonate and dimethylvinylene carbonate;

as an additive for positive electrode protection, at least one compound selected from the group consisting of propanesultone, 1,3-propenesultone, methylene methane disulfonate, dimethylene methane disulfonate and trimethylene methane disulfonate; and as an additive for overcharge prevention, at least one compound selected from the group consisting of cyclohexylbenzene, tert-butylbenzene, tert-amylbenzene, biphenyl, o-terphenyl, 4-fluorobiphenyl, fluorobenzene, 2,4-difluorobenzene and difluoroanisole.

3. A non-aqueous electrolyte lithium battery, comprising at least a positive electrode, a negative electrode and the electrolyte for the non-aqueous electrolyte battery according to claim 1.

4. The electrolyte for the non-aqueous electrolyte battery according to claim 1, wherein the phosphorus-containing acidic compound is contained in an amount of 50 to 500 mas ppm.

* * * * *